J. RUSSELL.
CORN HUSKER.
No. 90,311.  Patented May 18, 1869
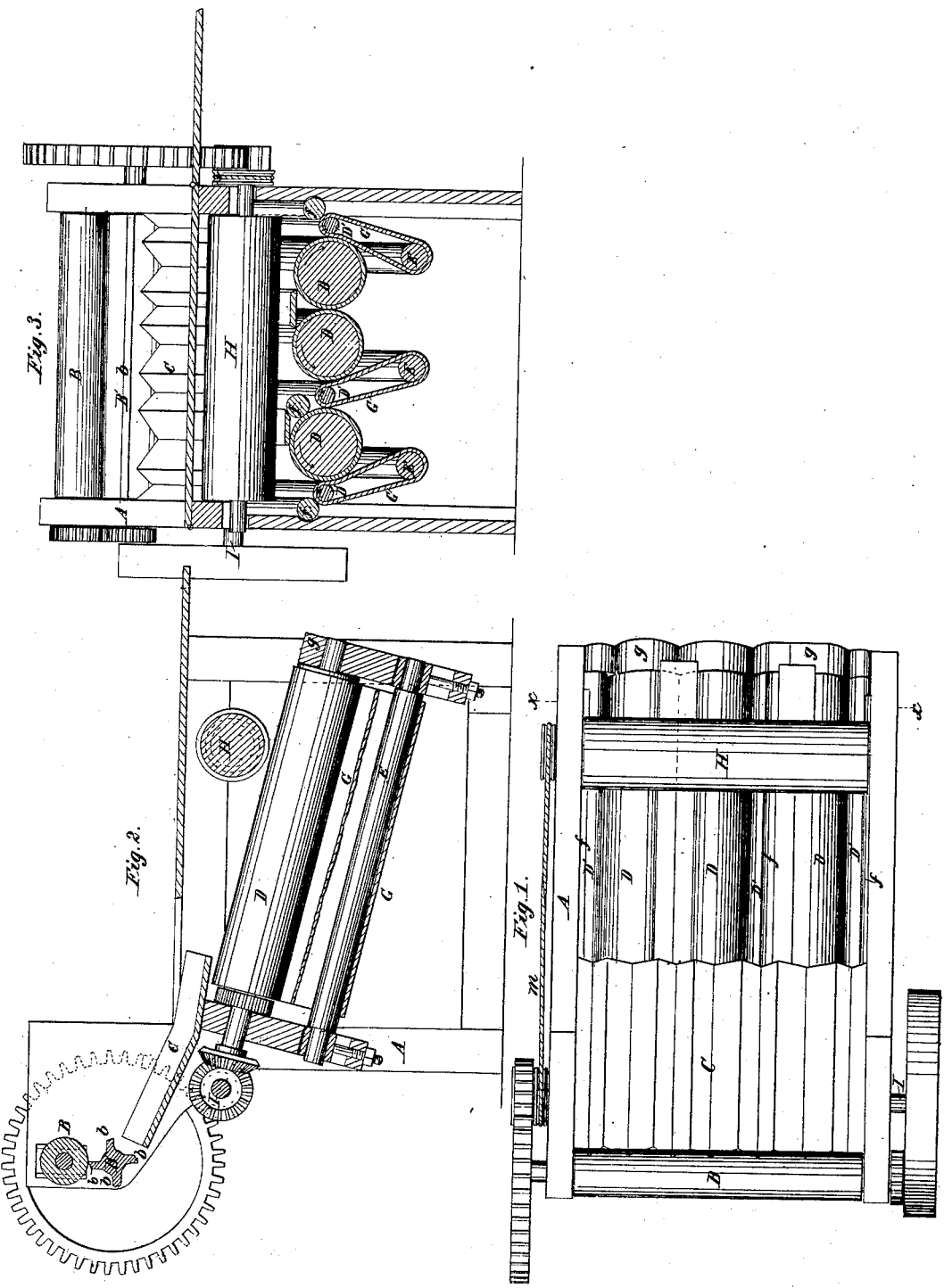

United States Patent Office.

JACOB RUSSELL, OF BROOKLYN, NEW YORK, ASSIGNOR TO HIMSELF, EDDY, REYNOLDS, AND COMPANY, MILTON HOLMES, AND JACOB CHASE.

Letters Patent No. 90,311, dated May 18, 1869.

IMPROVEMENT IN CORN-HUSKERS.

The Schedule referred to in these Letters Patent and making part of the same.

*To all whom it may concern:*

Be it known that I, JACOB RUSSELL, of the city of Brooklyn, in the county of Kings, and State of New York, have invented a new and useful Improvement in Corn-Huskers; and I do hereby declare that the following is a full, clear, and exact description of the same, reference being had to the accompanying drawings, which form part of this specification.

The difficulty heretofore attending the use of corn-husking machines has been the wrapping of the silk and husks of the corn around the husking or stripping-rollers, and the consequent cutting or breaking of the rollers, or the stopping of the machine.

Rollers have been made of sufficient circumference to prevent this evil, but in such cases the breadth and depth of the trough formed between them, and in which the ears are received and husked, have been such that the "bite" taken upon the ears by said rollers, in grasping the husks thereon for the stripping of the same, has been sometimes sufficient to grasp the ear, also, and carry it between the rollers, or else jam it so tightly between them as to break or stop the machine.

This invention consists in the construction of the rollers of each pair of stripping-rollers of a corn-husking machine, of different sizes, whereby provision is made for arranging the rollers with their axes in the same plane without destroying the husking-troughs.

It also consists in the combination, with these stripping-rolls, of an endless apron passing around the smaller roller of each pair, and around an additional roller, arranged below and parallel therewith, whereby a sufficient circumferential surface, without increase of diameter, is given to the combined rolls, with the endless apron passing around them, to obviate the evils mentioned above.

Referring to the accompanying drawings—

Figure 1 represents a plan view of a corn-husker, constructed according to my improvement;

Figure 2 represents a sectional view of the same; and

Figure 3, a transverse section, taken through the line $x\ x$, fig. 1.

Similar letters of reference indicate corresponding parts in the several figures.

A is the frame of the machine, having, in addition to its top or cover, a hinged or folding leaf, $a$, which, by being unfolded, may serve, in connection with the top, to support the stalks of corn preparatory to the husking-operation.

Supported in bearings, provided near the top of the forward end of the frame A, is a pair of feed-rollers, B B', between which the stalks are designed to be passed, and by which the ears of corn are separated from the said stalks during their passage between them, longitudinal cutters or separators, $b$, being supplied to the under roller B', for that purpose.

Situated below and extending in a rearward and downward-sloping direction behind the said rollers, is a corrugated inclined plane or grooved apron, C, the grooves whereof are designed for the reception and longitudinal sliding of the ears from the point where they are separated from the stalks to the stripping or husking-rollers D D'.

Said grooved apron C is so constructed and arranged as to bring one of its ridges V centrally over each one of the husking-troughs, so that the ears of corn are delivered from the grooves of the apron upon the husking-rollers, and allowed to roll down sideways into the said troughs, thereby preventing their endwise delivery from the said grooves into the husking-troughs.

The husking-rollers D D' are supported in bearings provided upon the end-pieces of the frame, and are arranged in pairs, the rollers of each pair being geared together by toothed gearing, and are arranged in the same line, and in an inclined position, nearly or quite equal to that of the grooved apron C.

Each pair of said rollers D D' consists of a large and a small roller, so that while arranged as described, with their axes in the same plane, one of them may extend above or be higher than the other, for a purpose hereinafter explained.

Below and parallel with each said pair of rollers D D', is an additional roller or belt-carrier, E, around which and the smaller roller D' thereof, is carried a broad belt or endless apron, G, of India rubber, or other suitable material, so as to add circumferential surface to the said smaller roller, without materially increasing its diameter, and thereby prevent the wrapping around it of the silks and husks, and yet leave it small enough diametrically to allow the ears to be grasped sufficiently for effecting the husking-operation only.

Situated above and to one side of the smaller roller D', and opposite the upper portion of the larger roller D of each pair, and so as to form a trough between it and the larger roller, the smaller roller D' serving as a bottom to the same, is a friction-roller, $f$.

Said friction-rollers $f$ are turned by the friction of contact of their peripheries with the outside of the endless aprons G, for the purpose of imparting a rotary or twisting-motion to the ears of corn as they are passed longitudinally along the troughs, and thereby to insure a more effectual husking of the ears all round.

Transversely arranged at or near the central portions of the husking-rollers, and a little above the same, is an ejecting-roller, H, the office of which is to carry off the husked ears toward the rear of the machine, where they may be dropped upon the ground, or within a suitable receptacle provided therefor.

By the construction of the rollers of each of the pairs of husking-rollers, provision is made for the arrangement of their axes in the same plane and yet preserve the husking-troughs unimpaired, and also for the covering of their journal-boxes by a common cap, g, thereby affording great facility for the removal of said rollers, when desirable, for cleaning, or for other purposes.

Motion is imparted to the feed-rollers B B', husking-rollers D D', and ejecting-roller H, through the medium of a transverse shaft, I.

Said shaft is situated below the feed-rollers B B', and gears with the lower or cutting-roller B', and passing immediately in front of the forward ends of the husking-rollers D D', gears, by means of bevelled gearing, with the forward end of one of the rollers of each pair thereof, and transmits motion to the ejecting-roller H, by means of a connecting-belt, m, passing over pulleys provided upon the corresponding ends of each.

Motion is imparted to the shaft I by any suitable application of power, and the stalks of corn being placed upon the machine, lengthwise thereof, are fed to the rollers B B', but ends foremost, and are passed between the same.

The ears being separated from the stalks during said passage by the cutting-roller B', drop upon the incline plane C, and slide downward through the longitudinal grooves thereof to the husking-rollers D D', and into the husking-troughs d, where the husks of the ears are caught between the larger roller and the endless apron upon the smaller roller of each pair of rollers, and stripped from the ears, the husks being carried down between said roller and endless apron, while the ears continue to slide downward in the direction of the ejecting-roller H, and are finally forced out by said roller behind the machine.

By means of the friction-roller f, the ears are made to turn upon their axes while passing down the troughs d, so as to present their entire surfaces to the action of the strippers, thereby rendering the stripping or husking-operation more certain and complete.

What I claim as my invention, and desire to have secured by Letters Patent, is—

1. The stripping-rollers D D', those of each pair being of different sizes, and having their axes arranged in the same plane whereby the husking-troughs are formed, substantially as specified.

2. The endless aprons G and the lower rollers or belt-carriers E, in combination with the stripping-rollers of a corn-husker, substantially as and for the purpose herein set forth.

3. The friction-rollers f, forming one side of the husking-trough, in combination with the endless apron G, for giving twisting-motion to the ears of the corn, substantially as specified.

4. The combination of the husking-rollers, as arranged with their axes in the same plane, and the lower rollers E, having adjustable boxes, whereby one roller may be removed without disturbing the others, and whereby the belts or aprons may be tightened at pleasure, substantially as herein described.

JACOB RUSSELL.

Witnesses:
FRED. HAYNES,
J. W. COOMBS.